Oct. 17, 1950   G. E. DATH   2,525,871

FRICTION SHOCK ABSORBER FOR RAILWAY CAR TRUCKS

Filed July 31, 1948

Inventor:
George E. Dath.
By Henry Fuchs.
Atty.

Patented Oct. 17, 1950

2,525,871

UNITED STATES PATENT OFFICE 2,525,871

FRICTION SHOCK ABSORBER FOR RAILWAY CAR TRUCKS

George E. Dath, Mokena, Ill., assignor to W. H. Miner, Inc., Chicago, Ill., a corporation of Delaware Application July 31, 1948, Serial No. 41,737

5 Claims. (Cl. 267—9)

1

This invention relates to improvements in friction shock absorbers, especially adapted for use in railway car trucks for snubbing the action of the usual truck spring.

One object of the invention is to provide a friction shock absorber comprising a pair of relatively slidable friction elements and spring means opposing relative lengthwise movement of the elements toward each other and pressing said elements into tight frictional engagement with each other, wherein the spring means is in the form of a helical coil of conical shape, which is distorted in the assembled condition of the device, to provide the required force to press the friction elements against each other.

Other objects of the invention will more clearly appear from the description and claims hereinafter following.

Figure 1:
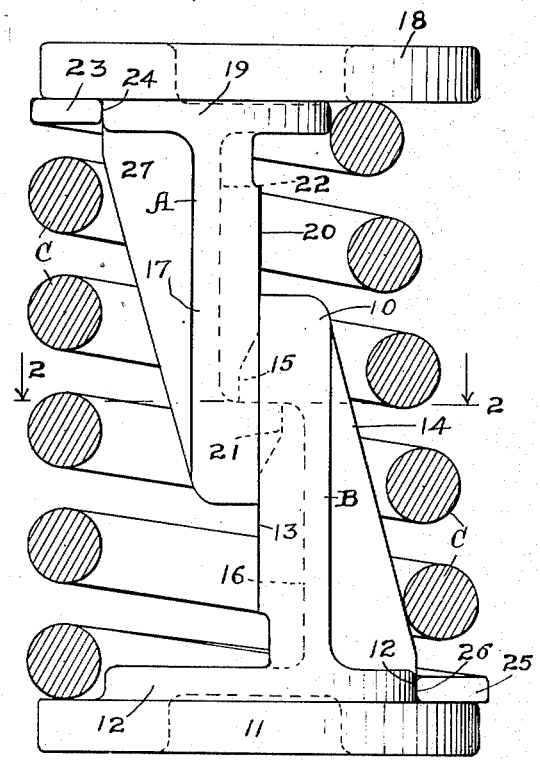
Figure 3:
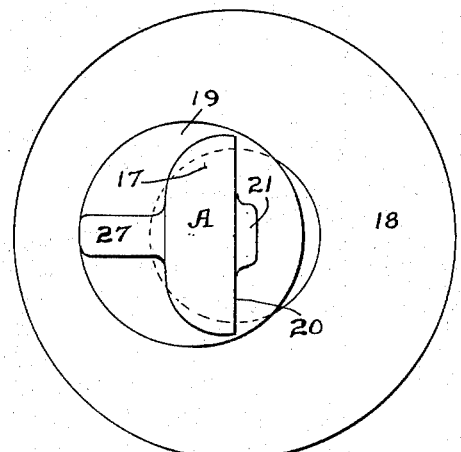
Figure 4:
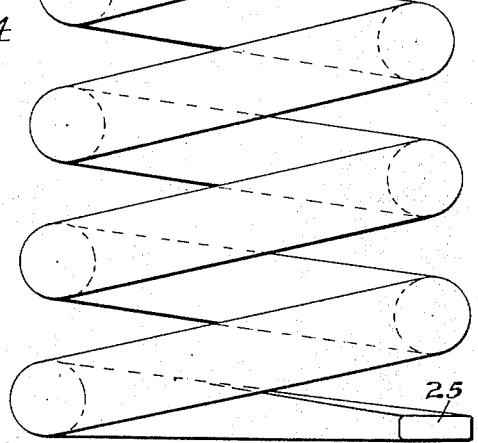
Figure 2:
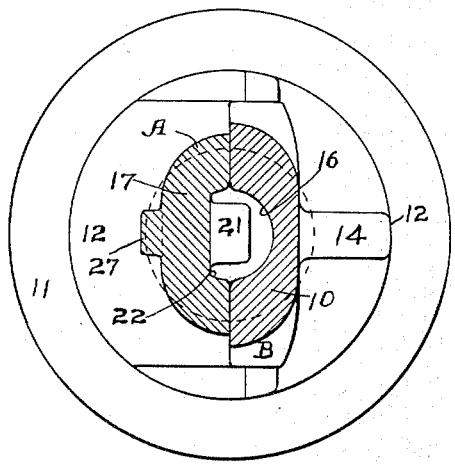

In the accompanying drawing forming a part of this specification, Figure 1 is a side elevational view of my improved friction shock absorber, illustrating the spring resistance member in transverse vertical section. Figure 2 is a horizontal sectional view, corresponding substantially to the line 2—2 of Figure 1. Figure 3 is a bottom plan view of the upper friction element. Figure 4 is a side elevational view of the conical spring employed in my improved friction shock absorber.

My improved friction shock absorber comprises broadly top and bottom friction posts A and B, and a spring C yieldingly opposing relative lengthwise movement of the posts toward each other.

The friction post B is at the bottom of the mechanism and includes a vertically disposed plate member 10 and a disc-like follower 11 at the bottom end of the plate member. The plate member 10 of the post is provided with a cylindrical base 12 in the form of an upstanding boss on the disc-like follower, concentric with the latter and eccentric to the plate member. On the inner side thereof, the plate member of the post presents a vertically extending, flat friction surface 13, adapted to cooperate with the post A. To reenforce the plate member 10 of the post B, a vertically disposed web 14 is provided on the rear side thereof, the web extending from the cylindrical base 12 to the upper end of the post and being formed integral therewith. On the friction surface side thereof, the post B is provided with a laterally projecting stop lug 15, which is adjacent the upper end thereof and cooperates with a similar lug on the post A. Below the stop lug 15, the friction surface side

2 of the plate member 10 is cut out or longitudinally slotted, as indicated at 16, to accommodate the corresponding lug of the post A.

The post A is at the top of the mechanism and includes a vertically disposed plate member 17 and a disc-like follower 18 at the upper end of the plate member. The follower 18 is of the same diameter as the follower 11 of the bottom post B and is vertically aligned therewith. The plate member 17 of the post A is provided with a cylindrical base 19 in the form of a depending boss on the follower 18, eccentric to said follower and concentric with the plate 17. As shown in Figure 1, the cylindrical base 19 of the post A is of smaller diameter than the cylindrical base 12 of the post B and is offset to the left with respect to the base 12 of the post B. On the inner side thereof, the plate member 17 of the post A presents a vertically disposed, flat friction surface 20, which is slidingly engaged with the friction surface 13 of the post B. The plate member of the post A is also provided with a reenforcing web 27, similar to the web 14 of the post B. On the friction surface side thereof, the post A is provided with a laterally projecting stop lug 21, similar to the lug 15 of the post B and engaged beneath the last named lug to cooperate therewith and limit lengthwise separation of the posts. Above the lug 21, the friction surface side of the post A is slotted lengthwise, as indicated at 22, to accommodate the lug 15 of the post B. As shown most clearly in Figure 2, the plate member 17 of the post A is of lesser width than the cooperating plate member 10 of the post B, the plate member 17 being reduced in width to facilitate assembling the post A with the conical spring C.

The spring C is in the form of a helical coil having its top and bottom ends bearing, respectively, on the follower members 18 and 11 of the posts A and B. The helical coil spring C is narrower at the top than at the bottom, in other words, the diameters of the coils of the spring progressively decrease from the bottom to the top of the spring. The helical coil spring C, as manufactured, before being assembled with the other parts of the device, is of frusto-conical form, as illustrated in Figure 4, the same being upwardly tapered. This frusto-conical spring, when applied to the posts A and B in assembling the mechanism, is distorted, as shown in Figure 1, the upper end coil which is engaged over the cylindrical base 19 of the post A being displaced to the left with respect to the central vertical axis of the spring as originally formed, The lower end coil of the spring C, which is seated on the follower 11 of the post B, in the assembled condition of the mechanism, is engaged about the cylindrical base 12 of the last named post. Inasmuch as the upper end of the frusto-conical spring C is displaced from its normal state toward the left, as shown in Figure 1, the same is distorted and exerts lateral inward pressure on the bases of the posts to press the friction surfaces thereof into tight frictional contact, the inner side of the upper end coil 23 of the spring exerting pressure on the left hand vertical side face 24 of the base 19 of the post A in a direction toward the right, and the inner side of the coil 25 at the bottom end of the spring exerting pressure toward the left on the right hand side face 26 of the base 12 of the post B.

In assembling the mechanism, the frusto-conical spring C is first engaged over the post B and seated on the follower 11 with its bottom end coil engaged about the cylindrical base 12. The top post A is then inserted downwardly through the upper end of the spring and forced into face to face engagement with the post B, being moved downwardly until the stop lug 21 passes the lug 15 and snaps in back of the latter. At the same time, as the post A is forced downwardly, the spring C is distorted to the position shown in Figure 1 by the upper end coil thereof being engaged over the cylindrical base 19 of the post A.

My improved friction shock absorber preferably replaces one or more of the spring units of a truck spring cluster of a railway car, being interposed between the usual top and bottom spring plates which cooperate with said cluster. The shock absorber, when assembled with the spring cluster, is normally under slight initial compression, due to the weight of the body of the railway car thereon.

The operation of the improved friction shock absorber is as follows: Upon the spring cluster of the truck of a railway car being compressed between the spring follower plates of the cluster, the friction shock absorber, which is disposed between said follower plates, is compressed therewith, thereby forcing the post A downwardly toward the post B, against the resistance of the spring C, sliding the same along the friction surface of the post B. During this action, the distorted frusto-conical spring presses the posts into tight frictional contact to produce the desired snubbing action. Upon recoil of the truck springs, the spring follower plates of the cluster move apart and the posts A and B are restored to the normal position shown in Figure 1, by the expansive action of the spring C, longitudinal separation of the posts being limited by the engagement of the lugs 15 and 21 with each other.

I claim:

1. In a friction shock absorber, the combination with a pair of relatively lengthwise movable friction posts at diametrically opposite sides of the mechanism having longitudinally extending, interengaging friction surfaces on their inner sides; of longitudinally aligned end followers integral with said posts, said followers being disposed at opposite ends of the mechanism; a cylindrical base portion on each post, the cylindrical base portion of one of said posts being concentric with the follower of the corresponding post, and the cylindrical base portion of the other post being eccentric to the follower of the corresponding post, said last named cylindrical base portion being of smaller diameter than said first named base portion; and a frusto-conical, helically coiled spring surrounding said posts and bearing at opposite ends on said followers, said spring being in distorted condition and having the end coil at its smaller end engaged over said cylindrical base portion of smaller diameter, and the end coil at its larger end engaged over the base portion of larger diameter.

2. In a friction shock absorber, the combination with a pair of relatively lengthwise movable friction posts at diametrically opposite sides of the mechanism having longitudinally extending, interengaging friction surfaces on their inner sides; of follower discs integral with said posts, said follower discs being of the same diameter and in axial alignment, said follower discs being disposed at opposite ends of the mechanism; a frusto-conical, helically coiled spring surrounding said posts and bearing at opposite ends on said follower discs, said spring being in distorted condition; a cylindrical base portion on one of said posts of relatively large diameter, concentric to the follower discs thereof and engaged in the larger end of said frusto-conical spring; and a cylindrical base portion on the other post, eccentric to the follower disc of said post, said last named base portion being of relatively smaller diameter and extending into and fitting within the smaller end of said frusto-conical spring.

3. In a friction shock absorber, the combination with upper and lower spring follower discs; of a post depending from said upper follower disc at one side of the longitudinal central axis of the mechanism, said post having a longitudinally extending friction surface on the inner side thereof; a second post upstanding from said lower follower disc at the diametrically opposite side of the mechanism, said last named post having a friction surface on its inner side extending lengthwise thereof and engaging with the friction surface of said first named post; a distorted frusto-conical coil spring surrounding said posts, said spring having its smaller end bearing on said upper follower disc and its larger end bearing on said lower follower disc, said follower discs being in axial alignment; a cylindrical base portion on said upstanding post concentric to said lower follower disc and engaged within the lower end of said spring; and a cylindrical base on said depending post eccentric to said upper follower disc, extending into and fitting within the upper end of said spring.

4. In a friction shock absorber, the combination with a pair of relatively lengthwise slidable friction posts at diametrically opposite sides of the mechanism having interengaging friction surfaces on their inner sides; of a distorted frusto-conical, helically coiled spring surrounding said posts; and a spring centering means on each follower, engaging the corresponding end of the spring interiorly at diametrically opposite sides, the mid point between the points of engagement between said centering means engaged in the smaller end of the conical spring being laterally offset to one side of the mid point between the points of engagement between the centering means which is engaged in the larger end of the conical spring to distort said spring and place the same under tension to force said posts laterally inwardly toward each other.

5. In a friction shock absorber, the combination with an upper spring follower plate; of a lower spring follower plate; an upper friction post depending from said upper plate; a lower friction post upstanding from said lower spring follower plate, said posts being at diametrically opposite sides of the mechanism and having longitudinally extending, interengaging friction surfaces on their inner sides; a cylindrical base on one of said posts eccentric to said posts; a cylindrical base on the other of said posts concentric with said last named post; and a frustoconical, helically coiled spring surrounding said posts and bearing at its top and bottom ends on said upper and lower spring follower plates, said spring having the inner side of the coil at one end thereof seated against the side of said first named cylindrical base portion at one side of the mechanism and having the inner side of the coil at the other end thereof seated against the side of the second named cylindrical base portion at the opposite side of the mechanism.

GEORGE E. DATH.

REFERENCES CITED

The following references are of record in the file of this patent:

UNITED STATES PATENTS

| Number | Name | Date |
|---|---|---|
| 904,490 | Lukens | Nov. 17, 1908 |
| 1,924,814 | Sproul | Aug. 29, 1933 |
| 2,410,160 | Haseltine | Oct. 29, 1946 |
| 2,410,165 | Johnson et al. | Oct. 29, 1946 |